(12) United States Patent
Eklund et al.

(10) Patent No.: US 7,939,355 B2
(45) Date of Patent: May 10, 2011

(54) SINGLE-MASK FABRICATION PROCESS FOR LINEAR AND ANGULAR PIEZORESISTIVE ACCELEROMETERS

(75) Inventors: Erik J. Eklund, Costa Mesa, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1026 days.

(21) Appl. No.: 11/541,073

(22) Filed: Sep. 29, 2006

(65) Prior Publication Data

US 2007/0084041 A1 Apr. 19, 2007

Related U.S. Application Data

(60) Provisional application No. 60/726,684, filed on Oct. 13, 2005, provisional application No. 60/726,723, filed on Oct. 13, 2005.

(51) Int. Cl.
*H01L 21/00* (2006.01)
*H01L 27/14* (2006.01)

(52) U.S. Cl. ............... 438/48; 257/414; 216/2
(58) Field of Classification Search ............ 438/49, 438/50, 61, 48; 257/414
See application file for complete search history.

(56) References Cited

U.S. PATENT DOCUMENTS

| 5,750,420 | A  | * | 5/1998 | Bono et al. | 438/52 |
| 6,365,056 | B1 | * | 4/2002 | Robert et al. | 216/2 |
| 6,389,899 | B1 | * | 5/2002 | Partridge et al. | 73/514.33 |
| 6,960,488 | B2 | * | 11/2005 | Brosnihan et al. | 438/52 |

OTHER PUBLICATIONS

Partridge, A. et al., "A High Performance Planar Piezoresistive Accelerometer," IEEE Journal of Microelectromechanical Systems, (JMEMS), vol. 9, No. 1, Mar. 2000, pp. 58-66.*

* cited by examiner

*Primary Examiner* — W. David Coleman
(74) *Attorney, Agent, or Firm* — Daniel L. Dawes; Marcus C. Dawes

(57) ABSTRACT

An accelerometer and a method of fabricating an integrated accelerometer comprises the steps of providing an SOI wafer with a selected resistivity to eliminate any need for additional doping of the SOI wafer, providing a single mask on the SOI wafer, and simultaneously defining all components of the accelerometer in the SOI wafer without using any pn-junctions to define any piezoresistive components and to provide the same resistivity of all components. The step of simultaneously defining all components of the accelerometer in the SOI wafer comprises defining all components of a linear or angular accelerometer.

10 Claims, 6 Drawing Sheets

SINGLE-MASK FABRICATION PROCESS FOR LINEAR AND ANGULAR PIEZORESISTIVE ACCELEROMETERS

RELATED APPLICATIONS

The present application is related to U.S. Provisional Patent Application, Ser. No. 60/726,684, filed on Oct. 13, 2005, and Ser. No. 60/726,723, filed on Oct. 13, 2005, which are incorporated herein by reference and to which priority is claimed pursuant to 35 USC 119.

BACKGROUND OF THE INVENTION

1. Field of the Invention

The invention relates to the field of the methods for fabricating piezoresistive accelerometers.

2. Description of the Prior Art

The fabrication of piezoresistive accelerometers is well known. While silicon-on-insulator (SOI) wafers have previously been utilized to fabricate piezoelectric accelerometers, these prior art processes use comparatively complex fabrication steps that require multiple masks and additional doping of the wafers. Examples of such processes are disclosed in Partridge et. al. "A High-Performance Planar Piezoresistive Accelerometer", Journal of Microelectromechanical Systems, Vol. 9, No. 1, pp. 58-66, 2000; and S. Huang et. al. "A Piezoresistive Accelerometer with Axially Stressed Tiny Beams for both Much Increased Sensitivity and Much Broadened Frequency Bandwidth", IEEE Transducers Conference 2003, pp. 91-94, 2003.

The manufacture of piezoresistive angular accelerometers is also previously known. However, their fabrication is comparatively complex and requires additional doping of the wafers. Examples such disclosures can be found in N. Furukawa et. al., "A structure of angular acceleration sensor using silicon cantilevered beam with piezoresistors", IEEE Conference on Industrial Electronics, Control, Instrumentation, and Automation, 1992, pp. 1524-1529, 1992.

SOI fabrication processes have been used in the past to achieve less temperature sensitive pressure sensors. However, pressure sensors are very different from accelerometers and do not require a free-standing proof mass. Also, while utilizing SOI wafers, these prior art methods still require multiple fabrication steps and masks. Disclosures are to be found in "Dielectrically Isolated Transducer Employing Single Crystal Strain Gages", U.S. Pat. No. 4,510,671.

Piezoresistive accelerometers are traditionally fabricated by doping selected areas of a wafer to create isolated pn-junctions. Often, two separate doping steps are employed to obtain both highly-doped conductors as well as lightly-doped piezoresistors. Once the piezoresistors and conductors have been defined, additional fabrication steps are required to etch the suspension system as well as the free-standing proof mass, which normally deflects in the out-of-plan direction. Typical disclosures are published in L. Roylance et. al., "A batch fabricated silicon accelerometer", IEEE Transactions on Electron Devices, ED-26, pp. 1911-1917, 1979; and I. Pavelescu et. al., "Uniaxial silicon piezoresistive accelerometer", IEEE International Semiconductor Conference, 2000, vol. 2, pp. 479-482, October 2000. Normally four or more masks are used in the prior art fabrication process making for complex and costly manufacturing. In addition, pn-junctions have high leakage currents at temperatures above 150° C., which is therefore the highest operational temperature of the sensors.

What is needed is a fabrication process that defines all components simultaneously in a Silicon-on-Insulator (SOI) wafer using a single mask. Further, what is needed is a fabrication technique which reduces the complexity of the fabrication and to allow for higher operational temperatures than traditional piezoresistive accelerometers by elimination of any pn-junction.

BRIEF SUMMARY OF THE INVENTION

The illustrated embodiment of the invention is a method for fabricating piezoresistive accelerometers. Normally multiple masks are required when fabricating piezoresistive accelerometers. By utilizing silicon-on-insulator (SOI) wafers with a selected resistivity, the fabrication process of the illustrated requires only one mask, thus reducing both the complexity and cost. Furthermore, the use of SOI wafers eliminates the need for a pn-junction normally required in piezoresistive sensors, allowing for less temperature sensitive sensors.

Since only one mask is required, the fabrication complexity is greatly reduced. In addition the accelerometers will be able to operate at higher temperatures.

The invention is to be used for acceleration measurements, including, but not limited to, the following applications: airbag deployment systems, car crash testing, munitions testing, inertial measurements, etc.

No prior art is known to exist where wafers with a selected resistivity are utilized to accomplish piezoresistive accelerometers without any additional doping fabrication steps. Furthermore, piezoresistive accelerometers have never previously been fabricated using a single mask.

More particularly the illustrated embodiment of the invention is an accelerometer and a method of fabricating an integrated accelerometer comprising the steps of: providing an SOI wafer with a selected resistivity to eliminate any need for additional doping of the SOI wafer; providing a single-mask on the SOI wafer; and simultaneously defining all components of the accelerometer in the SOI wafer without using any pn-junctions to define any piezoresistive components and to provide the same resistivity of all components.

The step of simultaneously defining all components of the accelerometer in the SOI wafer comprises defining all components of a linear or angular accelerometer.

The illustrated embodiment can also be characterized as an improvement in a fabrication process for an accelerometer or an accelerometer fabricated by an improvement in a method comprising defining all components in a wafer simultaneously using a single mask.

The step of defining all components in a wafer simultaneously using a single mask comprises the step of dry etching SOI wafers that have a selected resistivity to define piezoresistors which are isolated from each other without the use of a pn-junction.

In another embodiment the step of defining all components in a wafer simultaneously using a single mask comprises the step of defining low resistance conductors by defining the conductors to be much wider than the piezoresistors.

The step of defining all components simultaneously using a single mask comprises the step of defining on the silicon chip reference resistors to provide components for a second half of a Wheatstone bridge to eliminate the need for external resistors.

The step of defining all components simultaneously using a single mask comprises the step of defining linear and angular accelerometers with linear output characteristics.

The step of defining all components simultaneously using a single mask comprises the step of simultaneously defining a proof mass, suspension, narrow piezoresistors, narrow reference resistors, and wide conductors in a device layer on a silicon-on-insulator (SOI) wafer.

The step of defining a proof mass comprises the step of removing a silicon oxide layer in the silicon-on-insulator (SOI) wafer underneath the proof mass except for areas in the silicon oxide layer without release holes which define anchor points for the proof mass.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The illustrated embodiment is a method for fabricating piezoresistive accelerometers based on using Silicon-on-Insulator (SOI) wafers. By choosing wafers with a certain resistivity, the need for doping steps can be eliminated from the fabrication process and the devices can be fabricated using only a single photomask. Below we provide a description of piezoresistivity and the operation of piezoresistive accelerometers and then the illustrated embodiment of the invention is described in detail.

Piezoresistivity

Assume that a force is applied to the end of a long isotropic bar. The stress, σ, is then defined as F/A, where F is the applied force, and A the cross-sectional area. The resulting strain, ∈, is the change in length divided by the initial length, $\Delta L/L_0$. As long as the strain is not too large, many solid materials behave like linear springs, meaning that the displacement is proportional to the applied force or acceleration. The piezoresistive effect causes a change in resistance, $\Delta R$, when a conductive material with initial electrical resistance $R_0$ is subjected to stress. Assuming that the stress in a piezoresistor is mainly in the longitudinal direction, the change in resistance $\Delta R$ due to a change in beam length $\Delta L$ is $$\frac{\Delta R}{R_0} = GF \frac{\Delta L}{L_0} \quad (1)$$

where $R_0$ is the initial resistance, $L_0$ is the initial length, and GF is the gage factor. The gage factor can be calculated as Young's modulus multiplied by the piezoresistive coefficient, which are both determined by the material used.

Accelerometer Principles

Figure 1:
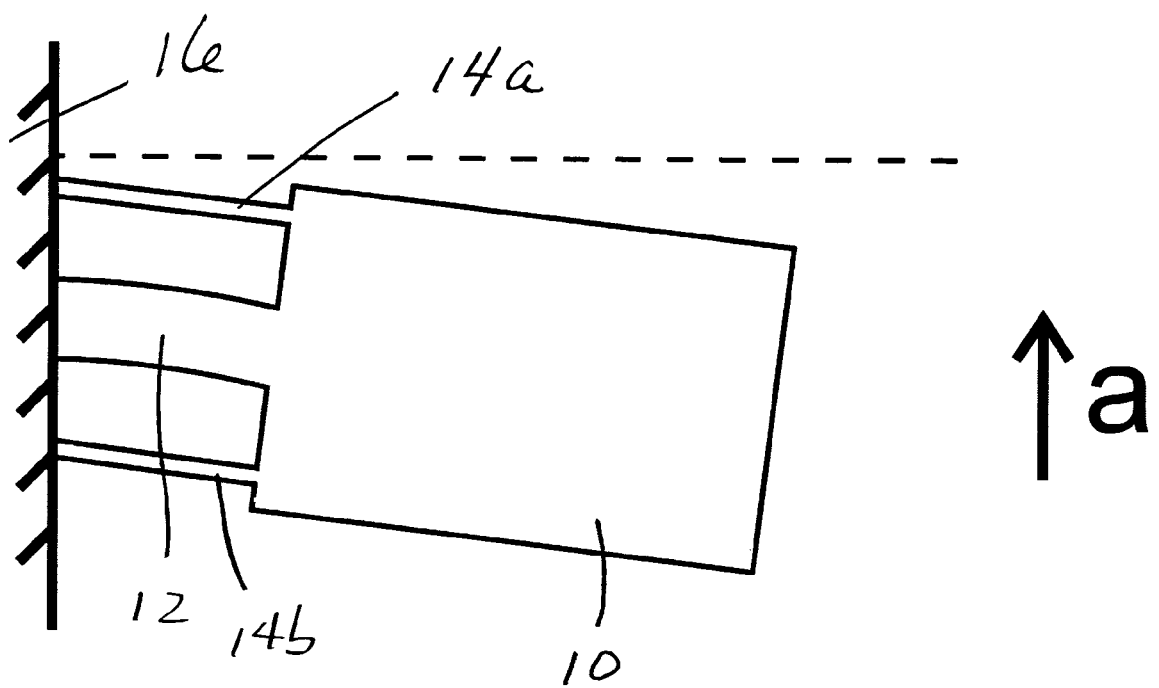
FIG. 1 is a diagram which illustrates the principle of simultaneous extension and compression of piezoresistive components couple to a proof mass.

For a quasi-static accelerometer, the deflection at the center of its proof mass is given by $$x = \frac{a}{(2\pi f_n)^2} \quad (2)$$

where x is the deflection, a the acceleration, and $f_n$, the natural frequency. For example, the conceptual illustration in FIG. 1 shows how a proof mass 10 deflects due to applied acceleration, a. The deflection leads to bending around the centrally located suspension beam 12 extending between mass 10 and a support 16, in turn stretching one of the piezoresistors 14a by $\Delta L$ and compressing the other piezoresistor 14b by $\Delta L$. This leads to increased resistance in the stretched piezoresistor 14a and decreased resistance in the compressed piezoresistor 14b, in accordance with equation (1). Thus, by detecting the change in resistance of piezoresistors 14a and 14b, the acceleration can be measured.

Simple Readout Circuitry

Figure 2:
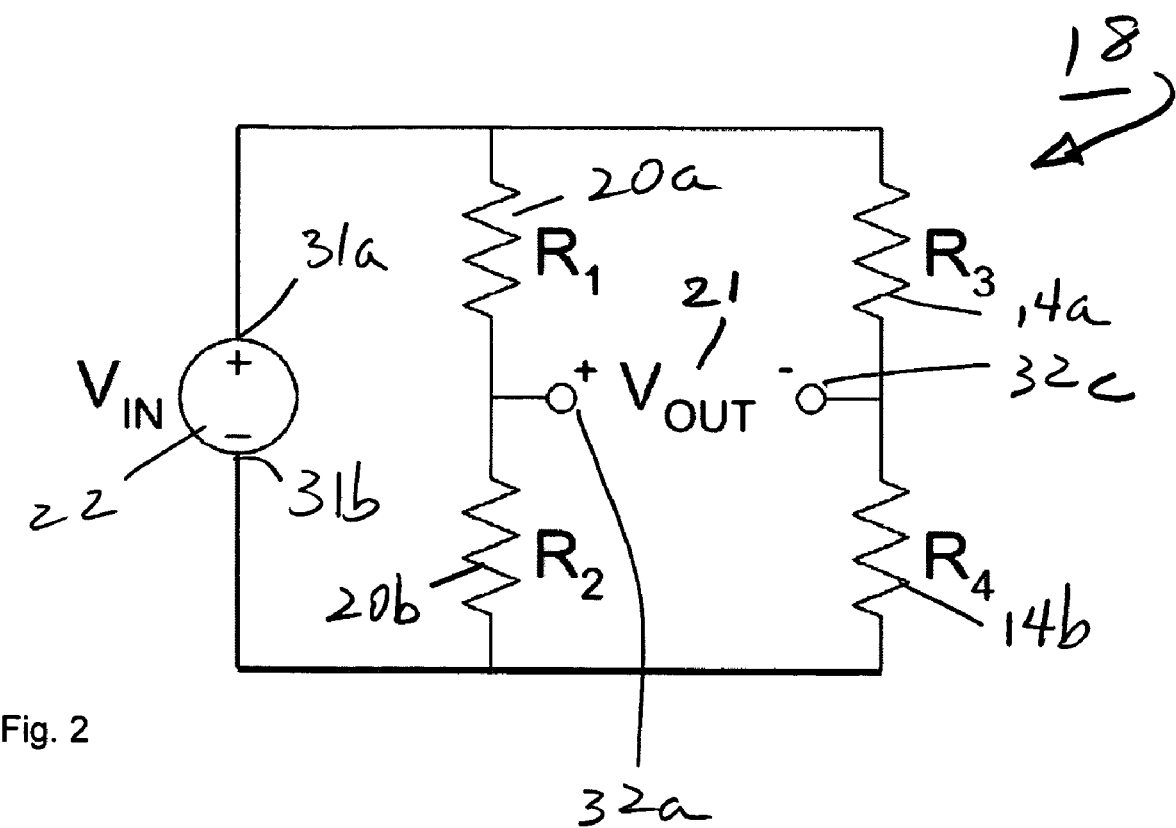
FIG. 2 is a circuit diagram of a conventional Wheatstone bridge used in accelerometers.

In order to obtain an output voltage a Wheatstone bridge 18 with a voltage source 22 connected between contacts 31a and 31b as shown in the circuit diagram of FIG. 2 can be used. Half of the bridge is comprised of the piezoresistors 14a and 14b of FIG. 1 and the other two resistors 20a and 20b are reference resistors, which are ideally included on the chip or wafer (not shown in FIG. 1) with the accelerometer and have the same temperature coefficients as the piezoresistors 14a and 14b. Assuming the initial resistances are all equal, the output voltage 21 between contacts 32a and 32c is Vout=Vin× $\Delta R/(2R)$.

Fabrication Process

Figure 3A:
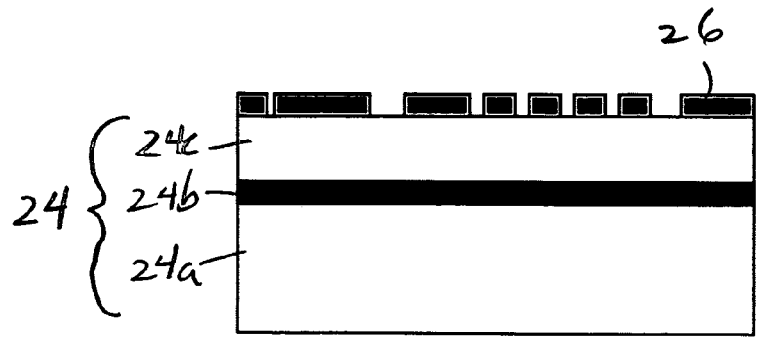
FIGS. 3a-3c are side cross sectional views of a wafer in which the process of the invention is practiced as seen through the section lines 3-3 of FIG. 3d.
Figure 3B:
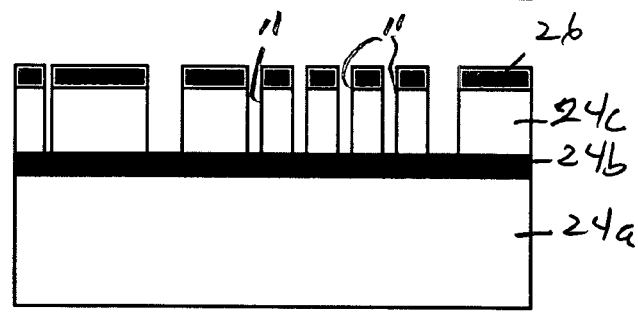
Figure 3C:
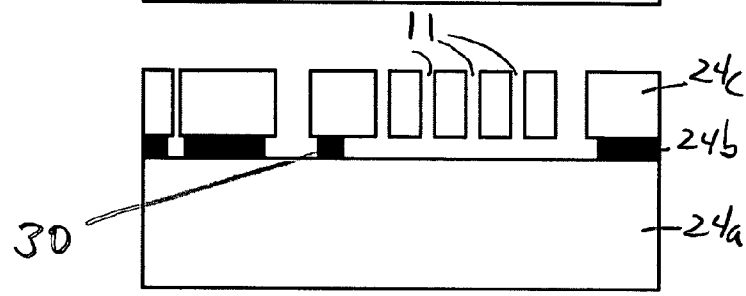
Figure 3D:
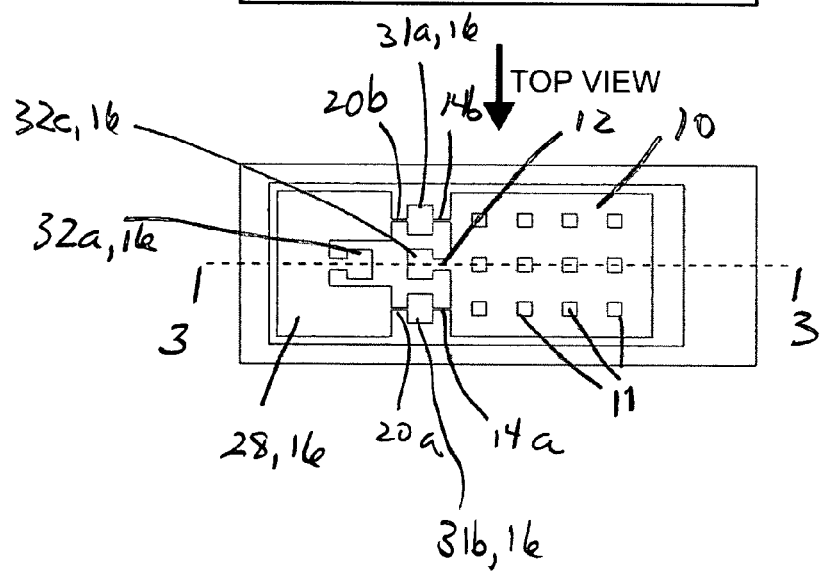
FIG. 3d is a top plan view of the completed accelerometer fabricated by the steps of FIGS. 3a-3c.

In addition to decreasing the number of fabrication steps, the single-mask process depicted in side cross sectional views of FIGS. 3a-3c as seen through the section lines 3-3 of the top plan view of FIG. 3d allows for higher operational temperatures than sensors where pn-junctions are used to insulate the piezoresistors due to large leakage currents in pn-junctions above 150° C. As shown in FIG. 3a the process utilizes Silicon-on-Insulator (SOI) wafers 24 and the proof mass 10, suspension 12, thin piezoresistors 14a, 14b, reference resistors 20a, 20b and wide conductors 28 are defined in the device layer simultaneously. The wafer 24 is comprised of a silicon substrate 24a, a silicon dioxide layer 24b and a silicon device layer 24c in which the components are to be defined. Wafer 24 is photolithographically patterned with a photoresist 26 in a conventional manner. The components are selectively defined or etched using deep reactive ion etching (DRIE) in layer 24c as shown in the step of FIG. 3b. The photoresist 26 is stripped and the silicon oxide layer 24b underneath the silicon device layer 24c is then selectively removed with hydrofluoric (HF) acid that penetrates through the etch holes 11 as shown in FIG. 3c and a free-standing proof mass 10 is obtained as shown in the top plan view of FIG. 3d. Areas without release holes define anchor points 30.

Figure 4:
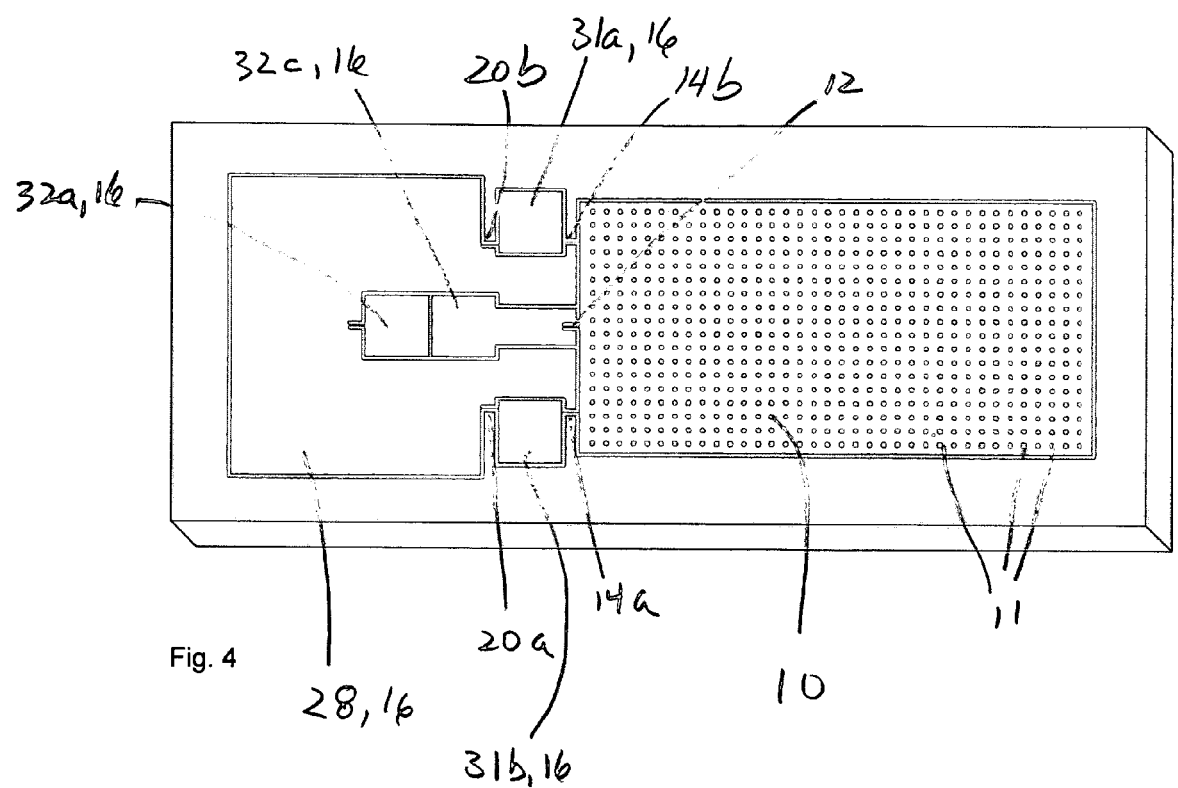
FIG. 4 is a top plan view of a linear accelerometer fabricated according to the invention.

The accelerometers are designed to emulate a Wheatstone bridge 18 as diagrammed in FIG. 2. In a linear accelerometer fabricated as shown in FIG. 4, a half-bridge configuration is used with both the piezoresistors 14a and 14b and reference resistors 20a and 20b included on the chip. A bias voltage is applied between bonding pads 31a and 31b. Applied acceleration will cause bending around the centrally located suspension hinge or flexure 12, and will stretch one of the piezoresistors 14a or 14b (increased resistance) and compress the other one of the piezoresistors 14a or 14b (decreased resistance). This in turn leads to an unbalanced bridge and the output voltage between bonding pads 32a and 32c is increased or decreased depending on the direction of the acceleration. While the piezoresistors 14a and 14b in FIG. 4 are attached between the proof mass 10 and support 16, the reference resistors 20a and 20b in FIG. 4 are attached between two supports 16. In conventional piezoresistive sensors, off-chip reference resistors are often used. Since the reference resistors 20a and 20b are here included on the chip and fabricated to have equal electrical parameters with to the piezoresistors 14a and 14b, they will have the same temperature properties as the piezoresistors 14a and 14b.

Figure 5:
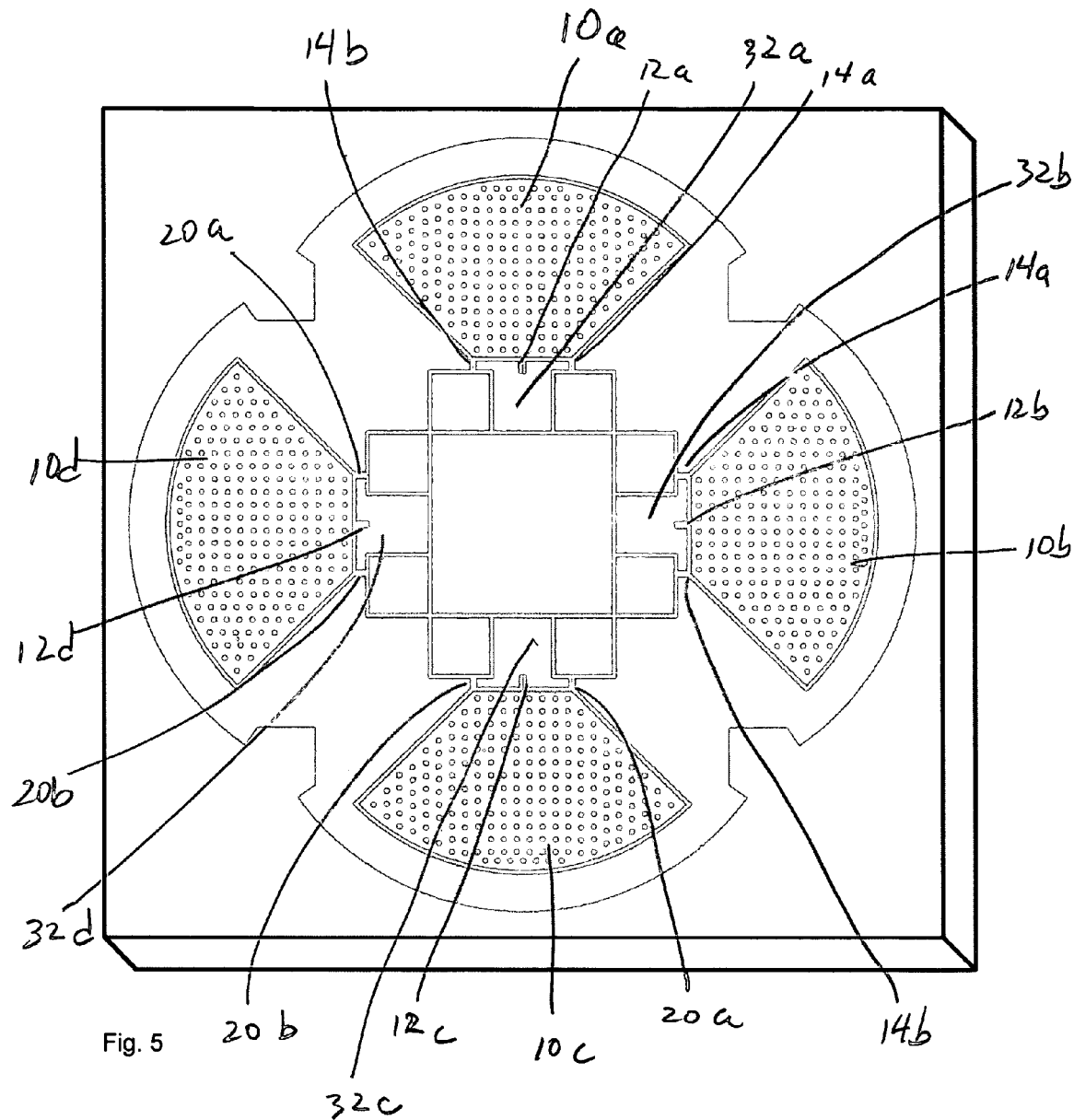
FIG. 5 is a top plan view of an angular accelerometer fabricated according to the invention.

An angular accelerometer is fabricated as shown in FIG. 5 and is configured as two separate full-bridges 18, one bridge comprised of masses 10a and 10c with flexures 12a and 12c, and the other bridge comprised of masses 10b and 10d with flexures 12b and 12d. All four resistors 14a, 14b, 20a and 20b in each of the Wheatstone bridges 18 are now piezoresistors. By properly connecting the bonding pads, the accelerometer can be configured to detect differential accelerations between two opposite masses 10a and 10c or opposite masses 10b and 10d. Thus, this device can be made immune to linear stimuli and will only measure angular accelerations.

For example, assume that acceleration is applied downward in the device of FIG. 5. Since piezoresistors 14a, 14b, 20a and 20b corresponding to masses 10a and 10c all are now parallel to the axis of acceleration, they are much stiffer than piezoresistors 14a, 14b, 20a and 20b corresponding to masses 10b and 10d, which are aligned perpendicularly to the axis of acceleration in this example. The longitudinal stiffness of beams 12a and 12c is $k_L = Ehw/L$ and the transverse stiffness is $k_T = Ehw^3/4L^3$, yielding a stiffness ratio of $k_L/k_T = 4L^2/w^2$, where L is the length and w the width of the beams 12a and 12c, which are identically sized and L>>w. Due to this large difference in stiffness in this stimulus direction, it can be assumed that the length of piezoresistors 14a, 14b, 20a and 20b corresponding to masses 10a and 10c will not change when acceleration is applied downward. The differential output is taken from the bonding pads 32a-32d connected to the suspension beams 12a-12d. Since piezoresistors 14a, 14b, 20a and 20b corresponding to masses 10a and 10c do not change their resistance, the differential output signal between pad 32a and 32c in FIG. 5 will not change.

Continuing with our example when acceleration is applied downward, piezoresistors 14a, and 20a corresponding to masses 10b and 10d will be compressed and therefore decrease their resistance. At the same time, piezoresistors 14b, and 20b corresponding to masses 10b and 10d will stretch and increase their resistance. Since the resistance of piezoresistors 14a, and 20a corresponding to masses 10b and 10d will decrease by an equal amount and the resistance of piezoresistors 14b, and 20b corresponding to masses 10b and 10d will also increase by an equal amount, the differential output voltage between pads 32d and 32b will not change and the Wheatstone bridge 18 will still be balanced. Similar arguments can be made for linear accelerations in the other directions.

However, when an angular acceleration is applied there will be a change in output voltage. For example, assume clockwise acceleration, which will lead to compression (decreased resistance) of the trailing piezoresistors, namely piezoresistor 14b corresponding to mass 10a, piezoresistor 14a corresponding to mass 10b, piezoresistor 20a corresponding to mass 10c, and piezoresistor 20b corresponding to mass 10d, and stretching (increased resistance) of the leading piezoresistors, namely piezoresistor 14a corresponding to mass 10a, piezoresistor 14b corresponding to mass 10b, piezoresistor 20b corresponding to mass 10c, and piezoresistor 20a corresponding to mass 10d. Since the resistance of piezoresistor 14a corresponding to mass 10a is increased and piezoresistor 14b corresponding to mass 10a is decreased, the voltage at pad 32a will decrease (assuming positive bias voltage). At the same time, the voltage at pad 32c will increase since the resistance of piezoresistor 20a corresponding to mass 10c is decreased and the resistance of piezoresistor 20b corresponding to mass 10c is increased. The voltage between pads 32c and 32a will therefore increase. Similarly, the voltage between pads 32b and 32d will decrease due to the changes in piezoresistors 14a, 14b, 20a and 20b corresponding to masses 10b and 10d.

Similar arguments can be made for counter-clockwise acceleration. Note that the increase/decrease of the output voltages depends on the bias voltage. If desired, both outputs can be designed to have the same sign during angular acceleration by reversing the bias voltage of one of the two full-bridges 18 in FIG. 5.

Figure 6:
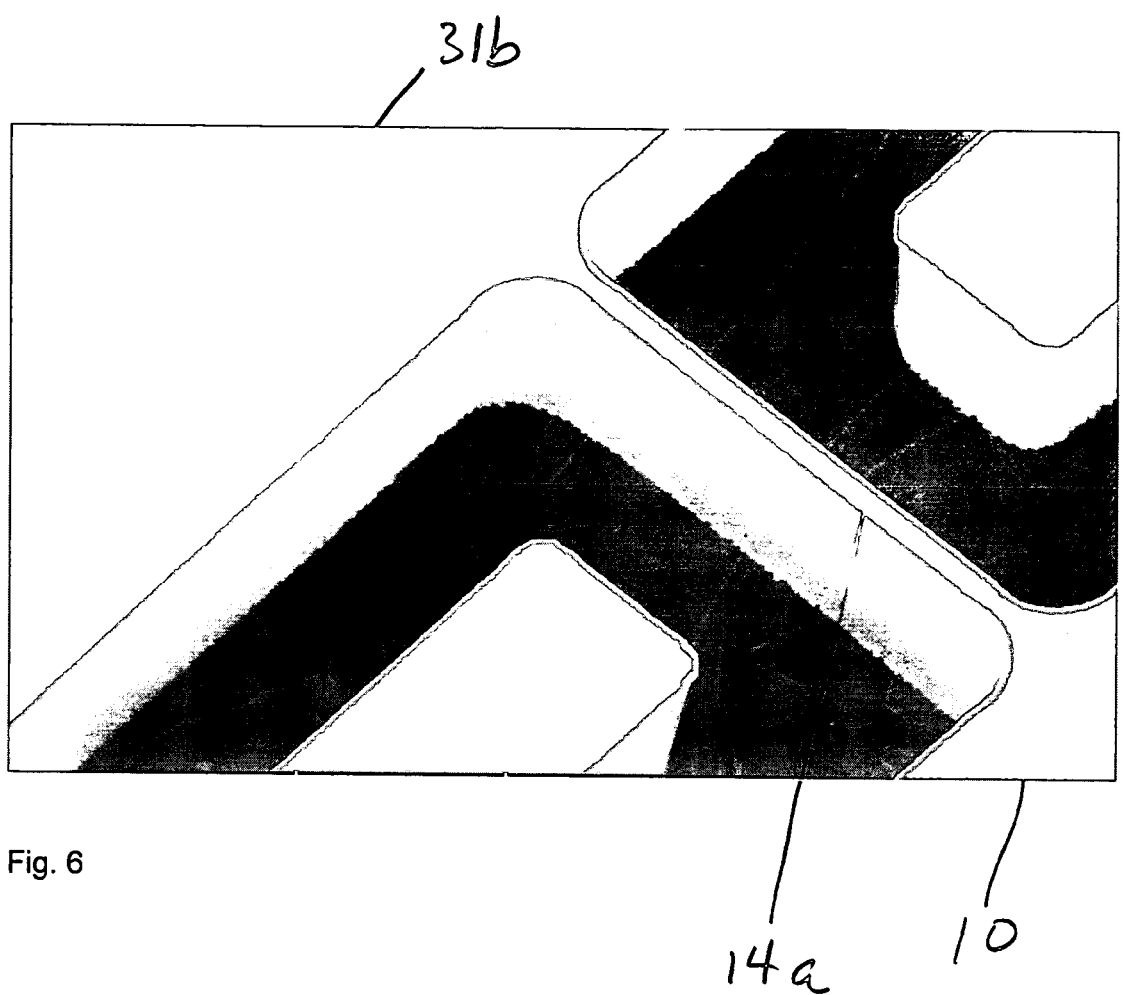
FIG. 6 is a microphotograph of a piezoresistor fabricated according to the invention.

A piezoresistor 14a fabricated according to the invention is depicted in FIG. 6. Note that the suspension beam 12 in FIG. 1 is preferably much wider than the piezoresistor 14a to assure that most of the bending occurs around the center of the suspension beam 12, which is the stiffer of the two.

An SOI-chip accelerometer was placed in a DIP-package and wire bonded. For proof of concept, aluminum wires were bonded straight onto the silicon, without using metal bonding pads, making this truly a single-mask fabrication process. However, ohmic contacts can readily be added to the process if desired and may improve the quality of the sensor.

In summary, it can now be appreciated that the illustrated embodiment of the invention provides for a:

Single-mask fabrication process for piezoresistive accelerometers;

Piezoresistive accelerometers free from pn-junctions;

Method for fabricating piezoresistive accelerometers, where wafers with a selected resistivity are utilized, eliminating the need for additional doping steps;

Piezoresistive design concept where the piezoresistors and the conductors have the same resistivity, but the piezoresistors are much narrower;

Process that applies to linear and angular piezoresistive accelerometers.

The illustrated embodiment is a fabrication process that defines all components of the accelerometer simultaneously using a single mask. By dry etching SOI wafers that have a selected resistivity, piezoresistors can be defined and insulated from each other and the bulk silicon without the pn-junction normally required in prior art piezoresistive accelerometers. Low resistance conductors are designed to be much wider than the piezoresistors and a free-standing proof mass 10 is obtained by selectively removing the silicon oxide layer.

Furthermore, reference resistors that provide the second half of a Wheatstone bridge 18 are included on the silicon chip, eliminating the need for external resistors. Both single-axis and angular accelerometers have been fabricated and linear output characteristics have been demonstrated when the single-axis devices are subjected to accelerations.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of fabricating an integrated piezoresistive accelerometer comprising:
    providing an SOI wafer with a SOI device layer of a selected resistivity to eliminate any need for additional doping of the SOI wafer;
    providing a single mask on the SOI wafer to define all mechanical and electrical elements in the integrated piezoresistive accelerometer in the SOI device with the selected resistivity; and
    simultaneously defining all components of the piezoresistive accelerometer in the SOI wafer by selective etching of the SOI device layer without using any pn-junctions to define any piezoresistive components and to provide the same resistivity of all components,
    where each of the piezoresistive components defined in the SOI device layer are released and isolated from a supporting layer and interconnected with selected ones of the electrical elements of the integrated piezoresistive accelerometer by corresponding low-resistance interconnects defined in the SOI device layer and having increased width relative to the corresponding piezoresistive component.

2. The method of claim 1 where simultaneously defining all components of the accelerometer in the SOI wafer comprises defining all components of a linear accelerometer in a single photolithographic step.

3. The method of claim 1 where simultaneously defining all components of the piezoresistive accelerometer in the SOI wafer comprises defining all components of an angular piezoresistive accelerometer in a single photolithographic step.

4. The method of claim 1, where defining all components in a wafer simultaneously using a single mask in a single photolithographic step comprises dry etching SOI wafers, having a device layer and a bulk silicon substrate separated by a silicon oxide layer, where the device layer in which piezoresistors are defined has a selected resistivity and the piezoresistors are isolated from each other and from the bulk silicon substrate by the silicon oxide layer, thus eliminating the need for any pry-junction.

5. The method of claim 1 where defining all components simultaneously using a single mask in a single photolithographic step comprises defining linear and angular accelerometers with linear output characteristics.

6. The method of claim 1 where defining all components simultaneously using a single mask comprises simultaneously defining a proof mass, suspension, narrow piezoresistors, narrow reference resistors and wide conductors in a device layer on a silicon-on-insulator (SOI) wafer in a single photolithographic step.

7. The method of claim 6 where defining a proof mass comprises removing a silicon oxide layer in the silicon-on-insulator (SOI) wafer underneath the proof mass except for areas in the silicon oxide layer without release holes which define anchor points for the proof mass.

8. An integrated piezoresistive accelerometer fabricated by:
    providing an SOI wafer with a SOI device layer of a selected resistivity to eliminate any need for additional doping of the SOI wafer;
    providing a single-mask on the SOI wafer; and
    simultaneously defining all mechanical and electrical components of the piezoresistive accelerometer in the in the SOI device layer with the selected resistivity without using any pn-junctions to define any piezoresistive components and to provide the same resistivity of all components, where each of the piezoresistive components defined in the SOI device layer are released and isolated from a supporting layer and interconnected with selected ones of the electrical elements of the integrated piezoresistive accelerometer by corresponding low-resistance interconnects defined in the SOI device layer and having increased width relative to the corresponding piezoresistive component.

9. The accelerometer of claim 8 where simultaneously defining all components of the accelerometer in the SOI wafer comprises defining all components of a linear accelerometer in a single photolithographic step.

10. The accelerometer of claim 8 where simultaneously defining all components of the piezoresistive accelerometer in the SOI wafer comprises defining all components of an angular piezoresistive accelerometer in a single photolithographic step.

* * * * *